US009167226B2

(12) United States Patent
Klein Gunnewiek et al.

(10) Patent No.: US 9,167,226 B2
(45) Date of Patent: Oct. 20, 2015

(54) SELECTING VIEWPOINTS FOR GENERATING ADDITIONAL VIEWS IN 3D VIDEO

(75) Inventors: Reinier Bernardus Maria Klein Gunnewiek, Utrecht (NL); Wilhelmus Hendrikus Alfonsus Bruls, Eindhoven (NL); Patrick Luc E. Vandewalle, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 441 days.

(21) Appl. No.: 13/499,319

(22) PCT Filed: Sep. 21, 2010

(86) PCT No.: PCT/IB2010/054251
§ 371 (c)(1),
(2), (4) Date: Mar. 30, 2012

(87) PCT Pub. No.: WO2011/039679
PCT Pub. Date: Apr. 7, 2011

(65) Prior Publication Data
US 2012/0188341 A1  Jul. 26, 2012

(30) Foreign Application Priority Data
Oct. 2, 2009 (EP) .................................. 09172096

(51) Int. Cl.
*H04N 13/00* (2006.01)
(52) U.S. Cl.
CPC ....... *H04N 13/0048* (2013.01); *H04N 13/0011* (2013.01)

(58) Field of Classification Search
USPC ........................................................ 348/43
See application file for complete search history.

(56) References Cited

U.S. PATENT DOCUMENTS

| 6,088,006 | A  | * | 7/2000 | Tabata ............................. 345/7 |
| 6,222,551 | B1 | * | 4/2001 | Schneider et al. ............ 345/419 |
| 2002/0110275 | A1 | * | 8/2002 | Rogina et al. .................. 382/154 |
| 2006/0050383 | A1 |   | 3/2006 | Takemoto |
| 2006/0170652 | A1 | * | 8/2006 | Bannai et al. ................. 345/156 |
| 2006/0200744 | A1 | * | 9/2006 | Bourke et al. ............. 715/500.1 |
| 2007/0103479 | A1 | * | 5/2007 | Kim et al. ...................... 345/581 |
| 2008/0198920 | A1 |   | 8/2008 | Yang |
| 2010/0177163 | A1 | * | 7/2010 | Yang et al. ...................... 348/45 |

FOREIGN PATENT DOCUMENTS

| EP | 1617683 A1 | 1/2006 |
| EP | 2040479 A2 | 3/2009 |

(Continued)

OTHER PUBLICATIONS

Izquierdo, Ebroul et al "Image-Based Rendering and 3D Modeling: A Complete Framework", Signal Processing Image Communication, vol. 15, 2000, pp. 817-858.

*Primary Examiner* — Tracy Li

(57) ABSTRACT

A method of encoding a video data signal (15) is provided, the method comprising providing at least a first image (21) of a scene (100) as seen from a first viewpoint, providing rendering information (22) for enabling the generation of at least one rendered image of the scene (100) as seen from a rendering viewpoint, providing a preferred direction indicator (23), defining a preferred orientation of the rendering viewpoint relative to the first viewpoint, and generating (24) the video data signal (15) comprising encoded data representing the first image, the rendering information and the preferred direction indicator.

11 Claims, 3 Drawing Sheets

(56) References Cited

FOREIGN PATENT DOCUMENTS

| | | |
|---|---|---|
| JP | 2004208255 A | 7/2004 |
| JP | 2008199670 A | 8/2008 |
| WO | 2007099465 A2 | 9/2007 |
| WO | 2009040701 A2 | 4/2009 |
| WO | 2009047681 A1 | 4/2009 |

* cited by examiner

SELECTING VIEWPOINTS FOR GENERATING ADDITIONAL VIEWS IN 3D VIDEO

FIELD OF THE INVENTION

This invention relates to a method of encoding a video data signal, the method comprising providing at least a first image of a scene as seen from a first viewpoint, providing rendering information for enabling the generation of at least one rendered image of the scene as seen from a rendering viewpoint and generating the video data signal comprising encoded data representing the first image and the rendering information.

This invention further relates to a method of decoding the video data signal, an encoder, a decoder, computer program products for encoding or decoding, the video data signal and a digital data carrier.

BACKGROUND OF THE INVENTION

In the emerging art of three-dimensional (3D) video, various methods exist for encoding a third dimension into the video data signal. Generally this is done by providing a viewer's eye with different views of the scene being watched. A popular approach for representing 3D video is to use one or more two-dimensional (2D) images plus a depth representation providing information of the third dimension. This approach also allows 2D images to be generated with different viewpoints and viewing angles than the 2D images which are included in the 3D video signal. Such an approach provides a number of advantages including allowing further views to be generated with relatively low complexity and providing an efficient data representation thereby reducing, e.g., storage and communication resource requirements for 3D video signals. Preferably, the video data is extended with data that is not visible from the available viewpoints, but becomes visible from a slightly different viewpoint. This data is referred to as occlusion or background data. In practice, the occlusion data is generated from multiview data obtained by capturing a scene with multiple cameras at different viewpoints.

It is a problem of the above described approaches that the availability of data for reconstructing de-occluded objects in newly generated views may differ from frame to frame and even within a frame. As a result, the quality of images generated for different viewpoints may vary.

OBJECT OF THE INVENTION

It is an object of the invention to provide a method of encoding a video data signal as described in the opening paragraph, which method enables generating higher quality images with different viewpoints.

SUMMARY OF THE INVENTION

According to a first aspect of the invention, this object is achieved by providing a method of encoding a video data signal, the method comprising providing at least a first image of a scene as seen from a first viewpoint, providing rendering information for enabling the generation of at least one rendered image of the scene as seen from a rendering viewpoint, providing a preferred direction indicator, defining a preferred orientation of the rendering viewpoint relative to the first viewpoint, and generating the video data signal comprising encoded data representing the first image, the rendering information and the preferred direction indicator.

As explained above, the quality of images generated from different viewing points is related to the availability of data needed for reconstruction of de-occluded objects. Consider the situation wherein data is available for shifting the view point to the left, but not for shifting the view point to the right. Consequently, shifting the viewpoint to the left may lead to a generated image with a different quality than shifting the viewpoint to the right.

A similar difference in quality may occur when insufficient de-occlusion information or no occlusion information is available for filling in de-occluded areas. In such a case the de-occluded areas may be filled in using so-called hole-filling algorithms. Generally such algorithms interpolate information from the direct vicinity of the de-occluded area. Consequently, shifting the viewpoint to the left may lead to a generated image with a different quality than shifting the viewpoint to the right.

Such differences in quality are not only influenced by the availability of required data, but also by the size and the nature of the surface area being de-occluded when shifting the viewpoint. As a result, the quality of a 3D video or image may vary according to the newly selected viewpoint. It could, e.g., matter whether a new view is generated at the left side or at the right side of the viewpoint of the already available first image.

According to the invention, it is a solution to generate a preferred direction indicator and to include it in the video signal. The preferred direction indicator defines a preferred orientation of the rendering viewpoint for an additional view relative to the original viewpoint of the image already included in the video signal. When the video signal is decoded, the preferred direction indicator can be used for selecting the rendering viewpoint and generating the rendered image of the scene from the selected viewpoint.

The video data signal may comprise a preferred direction indicator for every frame, every group of frames, every scene, or even for an entire video sequence. Encoding such information on a per frame basis rather than on a coarser granularity enables random access; e.g. for supporting trick play. As often the preferred rendering indicator is constant for various frames and the size of the encoded video signal is typically relevant, the amount of duplicate indicators may be reduced by instead encoding the information on group of frame basis. An even more efficient encoding is to encode the preferred direction on a per scene basis as preferably the preferred direction of rendering is kept the same throughout a scene, thereby warranting continuity within a scene.

Optionally when the size of the encoded signal is less critical information may be encoded on frame, group of frame and scene level alike, as long as all indicators are set in conformity with one another.

As changes in the choice of the rendering viewpoint may affect perceived continuity of the content at rendering, the preferred direction indicator is preferably kept constant for several frames. It may e.g. be kept constant throughout a group of frames or alternatively throughout a scene. It is noted that even when the preferred direction indicator is kept constant for several frames, it may still be advantageous to encode the constant preferred direction indicator on a smaller granularity than strictly necessary to facilitate random access.

The preferred orientation may be left, right, up, down or any combination of those directions. In addition to an orientation, a preferred distance or preferred maximum distance may be provided together with the preferred direction indication. If sufficient information about occluded objects and/or depth values of objects in the first image is available, it may be possible to generate multiple high quality additional views from viewpoints which may be further away from the original viewpoint.

The rendering information may, e.g., comprise occlusion data representing background objects being occluded by foreground objects in the first image, a depth map providing depth values of objects in the first image or transparency data for these objects.

The preferred direction indicator indicates for which possible rendering viewpoint the best rendering information is available. For more information relating to the rendering of layered depth images, see e.g. International Application WO2007/063477, hereby incorporated by reference. For more information regarding hole filling algorithms for use in filling de-occluded regions when rendering layered depth images, see e.g. WO2007/099465, hereby incorporated by reference.

According to a further aspect of the invention, a method of decoding a video data signal is provided, the video data signal comprising encoded data representing a first image of a scene as seen from a first viewpoint, rendering information for enabling the generation of at least one rendered image of the scene as seen from a rendering viewpoint and a preferred direction indicator, defining a preferred orientation of the rendering viewpoint relative to the first viewpoint. The method of decoding comprises receiving the video data signal, in dependence of the preferred direction indicator selecting the rendering viewpoint, and generating the rendered image of the scene as seen from the selected rendering viewpoint.

These and other aspects of the invention are apparent from and will be elucidated with reference to the embodiments described hereinafter.

DETAILED DESCRIPTION OF THE INVENTION

Figure 1:
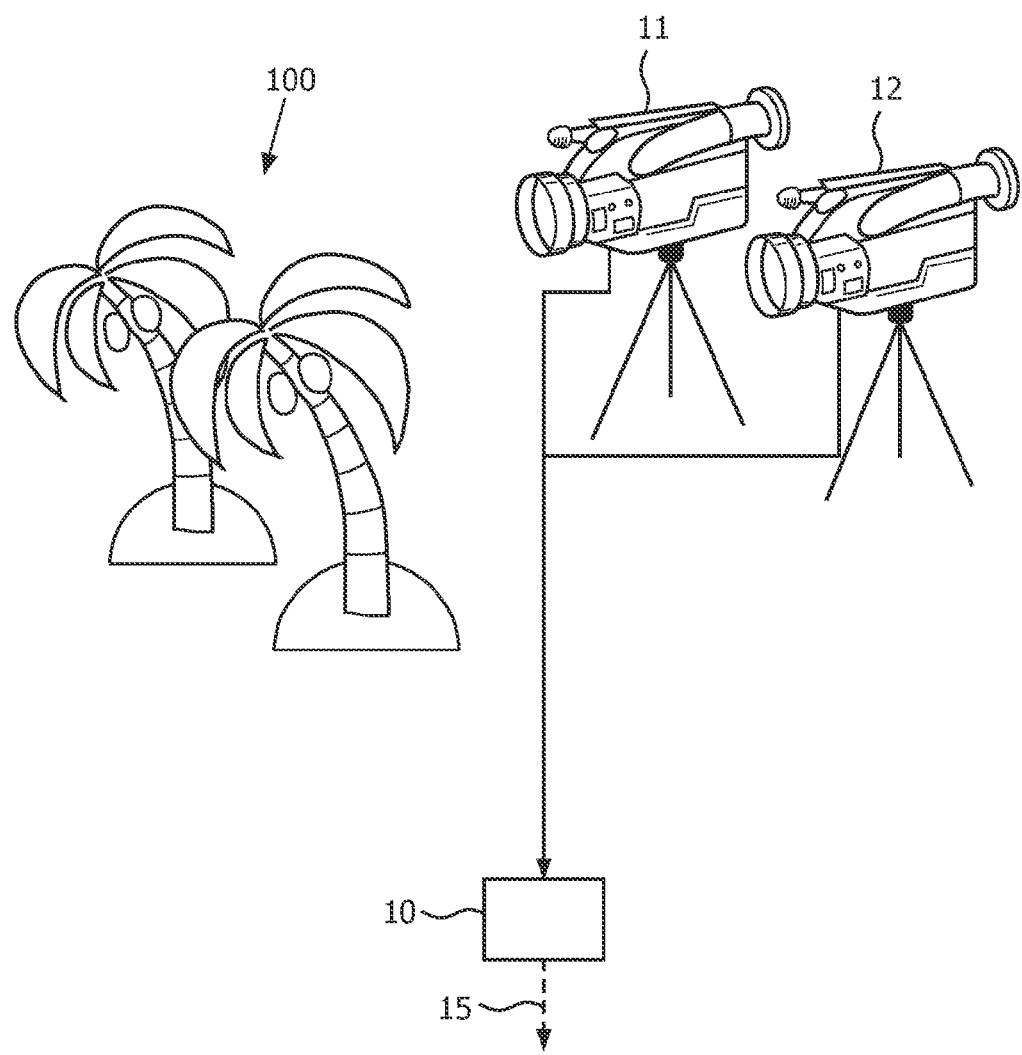
FIG. 1 shows a block diagram of a system for encoding video data according to the invention.

FIG. 1 shows a block diagram of a system for encoding video data according to the invention. The system comprises two digital video cameras 11, 12 and an encoder 10. The first camera 11 and the second camera 12 record the same scene 100, but from a slightly different position and thus also from a slightly different angle. The recorded digital video signals from both video cameras 11, 12 are sent to the encoder 10. The encoder may, e.g., be part of a dedicated encoding box, a video card in a computer or a software implemented function to be executed by a general purpose microprocessor. Alternatively, the video cameras 11, 12 are analog video cameras and the analog video signals are converted to digital video signals before they are provided as input for the encoder 10. If the video cameras are coupled to the encoder 10, the encoding may take place during the recording of the scene 100. It's also possible to record the scene 100 first and to provide the recorded video data to the encoder 10 later.

The encoder 10 receives the digital video data from the video cameras 11, 12, either directly or indirectly, and combines both digital video signals into one 3D video signal 15. It is to be noted that both video cameras 11, 12 may be combined in one 3D video camera. It is also possible to use more than two video cameras to capture the scene 100 from more than two viewpoints.

Figure 2:
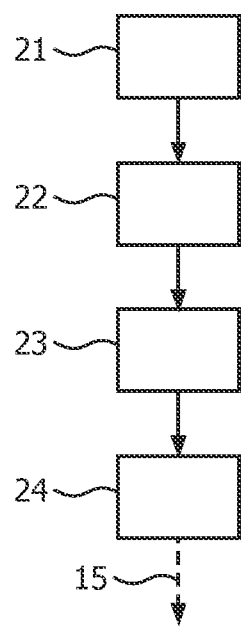
FIG. 2 shows a flow diagram of an encoding method according to the invention.

FIG. 2 shows a flow diagram of an encoding method according to the invention. This encoding method may be performed by the encoder 10 of the system of FIG. 1. The encoding method uses the recorded digital video data from the cameras 11, 12 and provides a video data signal 15 according to the invention. In base image providing step 21, at least a first image of the scene is provided for inclusion in the video data signal 15. This base image may be standard 2D video data coming from one of the two cameras 11, 12. The encoder 10 may also use two base images; one from the first camera 11 and one from the second 12. From the base images, color values of all pixels in each frame of the recorded video can be derived. The base images represent the scene at a certain moment in time as seen from a specific viewpoint. In the following, this specific viewpoint will be called the base viewpoint.

In 3D enabling step 22, the incoming video data from the video cameras 11, 12 is used to add information to the base image. This added information must enable a decoder to generate a rendered image of the same scene from a different viewpoint. In the following, this added information is called rendering information. The rendering information may, e.g., comprise depth information or transparency values of objects in the base image. The rendering information may also describe objects that are blocked from being viewed from the base viewpoint by objects visible in the base image. The encoder uses known, preferably standardized, methods for deriving this rendering information from the recorded regular video data.

In direction indicating step 23, the encoder 10 further adds a preferred direction indicator to the rendering information. The preferred direction indicator defines a preferred orientation of the rendering viewpoint for an additional view relative to the base viewpoint. When, later on, the video signal is decoded, the preferred direction indicator can be used for selecting the rendering viewpoint and generating the rendered image of the scene 100 from the selected viewpoint. As described above, the quality of a 3D video or image may vary according to the newly selected viewpoint. It could, e.g., matter whether a new view is generated at the left side or at the right side of the viewpoint of the already available first image. The preferred direction indicator which is added to the rendering information may, e.g., be a single bit indicating a left or right direction. A more advanced preferred direction indicator may also indicate an up or down direction and/or a preferred or maximum distance of the new viewpoint relative to the base viewpoint.

Alternatively, the preferred direction indicator may provide a preferred orientation and/or distance of multiple rendering viewpoints relative to the first viewpoint. For example, it may be preferred to generate two rendering viewpoints at the same side of the first viewpoint or one at each side. The preferred position(s) of the rendering viewpoint(s) relative to the first viewpoint may depend on the distance between those two points. It may, e.g., be better to render an image from a viewpoint at the left side of the first viewpoint when both viewpoints are close together; while for larger distances between both viewpoints to the left side of the first viewpoint may be more suitable for generating the rendering viewpoint.

The decision as to which particular direction is more favorable may be determined automatically; e.g. when encoding a stereo pair as a layered depth image, using an image, depth and occlusion representation, it is possible to use either the left or right image as the image of the layered depth image, and to reconstruct the other image based thereon. Subsequently a difference metric can be computed for both alternatives and the preferred encoding and therewith direction can be determined based thereon.

Preferably the differences are weighted based on a model of the human visual perceptive system. Alternatively, in particular within a professional setting the preferred direction could be selected based on user-interaction.

In signal generating step 24, the information provided in the previous steps 21, 22, 23 is used for generating a video data signal 15 according to the invention. The video data signal 15 at least represents the first image, the rendering information and the preferred direction indicator. A preferred direction indicator may be provided for each frame, for a group of frames or for a complete scene or even a complete video. Changing the position of the rendering viewpoint during a scene may have a negative influence on the perceived 3D image quality, but may on the other hand be necessary if the availability of rendering information for different directions changes considerably.

Figure 3:
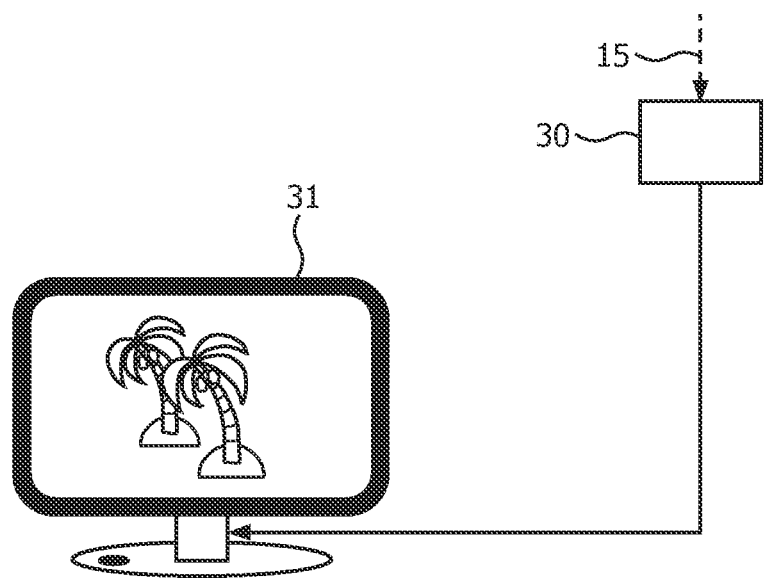
FIG. 3 shows a block diagram of a system for decoding video data according to the invention.

FIG. 3 shows a block diagram of a system for decoding video data according to the invention. The system comprises a decoder 30 for receiving the video data signal 15 and converting the video data signal 15 into a display signal which is suitable for being displayed by a display 31. The video data signal 15 may reach the decoder 30 as part of a broadcasted signal, e.g., via cable or satellite transmission. The video data signal 15 may also be provided on request, e.g., via the Internet or via a video-on-demand service. Alternatively, the video data signal 15 is provided on a digital data carrier, such as a DVD or Blu-ray disc.

The display 31 is capable of providing a 3D presentation of the scene 100 that was captured and encoded by the encoder 10 of the system of FIG. 1. The display 31 may comprise the decoder 30 or may be coupled to the decoder 30. For example, the decoder 30 may be part of a 3D video receiver which is to be coupled to one or more normal television or computer displays. Preferably, the display is a dedicated 3D display 31 capable of providing different views to different eyes of a viewer.

Figure 4:
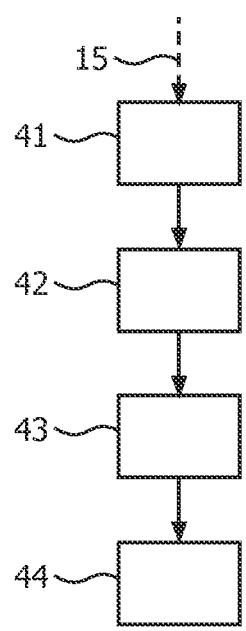
FIG. 4 shows a flow diagram of a decoding method according to the invention.

FIG. 4 shows a flow diagram of a decoding method as it may be performed by the decoder 30 of FIG. 3. In video data receiving step 41, the video data signal 15 encoded by the encoder 10 is received at an input of the decoder 30. The received video data signal 15 comprises encoded data representing at least the first image of the scene 100, rendering information and the preferred direction indicator.

In additional viewpoint selection step 42, the preferred direction indicator is used for selecting at least one additional viewpoint for a respective additional view. In additional view rendering step 43, one or more additional views from the selected viewpoint or viewpoints are generated. In display step 44, two or more views from different viewpoints may then be provided to the display 31 for showing the scene 100 in 3D.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of encoding a 3D video data signal, the method comprising:
   in a processor,
   providing at least a first image of a scene as seen from a first viewpoint,
   providing rendering information for enabling a decoder to generate at least one rendered image of the scene as seen from a rendering viewpoint, providing a preferred direction indicator, defining a preferred orientation of the rendering viewpoint relative to the first viewpoint being different than the first viewpoint, and generating the 3D video data signal comprising encoded data representing the first image, the rendering information and the preferred direction indicator, wherein a preferred direction indicator is encoded in the 3D video data signal using at least one of the following options a preferred direction indicator is encoded for every frame, a preferred direction indicator is encoded for every group of frames and a preferred direction indicator is encoded for every scene, wherein the value of the preferred direction indicator is constant for one of a group of frames and a scene.

2. A method of encoding a 3D video data signal as claimed in claim 1 wherein the preferred orientation is dependent on a distance between the first viewpoint and the rendering viewpoint.

3. A method of encoding a 3D video data signal as claimed in claim 1 wherein the rendering information comprises depth indication values for pixels in the first image.

4. A method of encoding a 3D video data signal as claimed claim 1 wherein the rendering information comprises alpha values for pixels in the first image, the alpha values indicating a transparency of the respective pixels.

5. A method of encoding a 3D video data signal as claimed in claim 1 wherein the rendering information comprises occlusion data representing data being occluded from the first viewpoint.

6. A method of encoding a 3D video data signal, the method comprising:

in a processor, providing at least a first image of a scene as seen from a first viewpoint, providing rendering information for enabling a decoder to generate at least one rendered image of the scene as seen from a rendering viewpoint, providing a preferred direction indicator, defining a preferred orientation of the rendering viewpoint relative to the first viewpoint being different than the first viewpoint, and generating the 3D video data signal comprising encoded data representing the first image, the rendering information and the preferred direction indicator wherein the preferred direction indicator is one of a single bit for defining whether the preferred orientation of the rendering viewpoint relative to the first viewpoint is to the left or right, above or below of the first viewpoint or a preferred or maximum distance of the rendering viewpoint relative to the first viewpoint.

7. A method of decoding a 3D video data signal, the 3D video data signal comprising encoded data representing a first image of a scene as seen from a first viewpoint, rendering information for enabling the generation of at least one rendered image of the scene as seen from a rendering viewpoint being different than the first viewpoint, and a preferred direction indicator, defining a preferred orientation of the rendering viewpoint relative to the first viewpoint, the method comprising:

In a processor, receiving the video data signal, in dependence of the preferred direction indicator wherein the preferred direction indicator is one of a single bit for defining whether the preferred orientation of the rendering viewpoint relative to the first viewpoint is to the left or right, above or below of the first viewpoint or a preferred or maximum distance of the rendering viewpoint relative to the first viewpoint, selecting the rendering viewpoint, and generating the rendered image of the scene as seen from the selected rendering viewpoint.

8. An encoder for encoding a video data signal, the encoder comprising:

a processor to provide at least a first image of a scene as seen from a first viewpoint, rendering information for enabling a decoder to generate a rendered image of the scene as seen from a rendering viewpoint being different than the first viewpoint, and a preferred direction indicator, defining a preferred orientation of the rendering viewpoint relative to the first viewpoint, generate the 3D video data signal comprising encoded data representing the first image, the rendering information and the preferred direction indicator, wherein the preferred direction indicator is one of a single bit for defining whether the preferred orientation of the rendering viewpoint relative to the first viewpoint is to the left or right, above or below of the first viewpoint or a preferred or maximum distance of the rendering viewpoint relative to the first viewpoint, and an output for providing the 3D video data signal.

9. A decoder for decoding a 3D video data signal, the decoder comprising:

an input for receiving a 3D video data signal, the video data signal comprising encoded data representing a first image of a scene as seen from a first viewpoint, rendering information for enabling the generation of a rendered image of the scene as seen from a rendering viewpoint being different than the first viewpoint, and a preferred direction indicator, defining a preferred orientation of the rendering viewpoint relative to the first viewpoint, a processor to, in dependence of the preferred direction indicator wherein the preferred direction indicator is one of a single bit for defining whether the preferred orientation of the rendering viewpoint relative to the first viewpoint is to the left or right, above or below of the first viewpoint or a preferred or maximum distance of the rendering viewpoint relative to the first viewpoint, select the rendering viewpoint, generate the rendered image of the scene as seen from the selected rendering viewpoint, and an output for providing the rendered image.

10. A computer program embedded in non-transitory readable medium including code for encoding a video data signal, which is operative to cause a processor to perform the encoding, the medium comprising code for:

providing at least a first image of a scene as seen from a first viewpoint, providing rendering information for enabling a decoder to generate at least one rendered image of the scene as seen from a rendering viewpoint, providing a preferred direction indicator, defining a preferred orientation of the rendering viewpoint relative to the first viewpoint being different than the first viewpoint, and generating the 3D video data signal comprising encoded data representing the first image, the rendering information and the preferred direction indicator wherein the preferred direction indicator is one of a single bit for defining whether the preferred orientation of the rendering viewpoint relative to the first viewpoint is to the left or right, above or below of the first viewpoint or a preferred or maximum distance of the rendering viewpoint relative to the first viewpoint.

11. A method of decoding a 3D video data signal, the 3D video data signal comprising encoded data representing a first image of a scene as seen from a first viewpoint, rendering information for enabling the generation of at least one rendered image of the scene (100) as seen from a rendering viewpoint being different than the first viewpoint, and a preferred direction indicator, defining a preferred orientation of the rendering viewpoint relative to the first viewpoint, the method comprising:

in a processor, receiving the video data signal, in dependence of the preferred direction indicator, wherein the preferred direction indicator is encoded in the 3D video data signal using at least one of the following options a preferred direction indicator is encoded for every frame, a preferred direction indicator is encoded for every group of frames and a preferred direction indicator is encoded for every scene, wherein the value of the preferred direction indicator is constant for one of a group of frames and a scene selecting the rendering viewpoint, and generating the rendered image of the scene as seen from the selected rendering viewpoint.

* * * * *